(12) United States Patent
Black et al.

(10) Patent No.: US 7,114,289 B2
(45) Date of Patent: Oct. 3, 2006

(54) APPARATUS FOR DISPENSING FLUID INTO A TREE

(75) Inventors: Kevin C. Black, Waubaushene (CA); Joe Meating, Sault Ste. Marie (CA)

(73) Assignee: Bio Forest Technologies Inc., Sault Ste. Marie (CA)

( * ) Notice: Subject to any disclaimer, the term of this patent is extended or adjusted under 35 U.S.C. 154(b) by 18 days.

(21) Appl. No.: 10/783,033

(22) Filed: Feb. 23, 2004

(65) Prior Publication Data

US 2005/0223637 A1    Oct. 13, 2005

(51) Int. Cl.
B27B 25/00    (2006.01)
(52) U.S. Cl. ......................... 47/57.5; 604/131
(58) Field of Classification Search .............. 47/57.5; A01G 29/00
See application file for complete search history.

(56) References Cited

U.S. PATENT DOCUMENTS

| | | | |
|---|---|---|---|
| 4,011,685 A * | 3/1977 | Boyd et al. ................... | 47/57.5 |
| 4,365,440 A | 12/1982 | Lenardson | |
| 4,394,863 A | 7/1983 | Bartner | |
| 4,596,088 A | 6/1986 | Graber | |
| 4,723,937 A | 2/1988 | Sarnoff et al. | |
| 4,739,901 A | 4/1988 | Dorfman et al. | |
| 4,766,659 A | 8/1988 | Cronenwett et al. | |
| 4,991,742 A * | 2/1991 | Chang .......................... | 222/95 |
| 4,997,420 A * | 3/1991 | LeFevre ..................... | 604/121 |
| 5,060,704 A * | 10/1991 | Rohrbough ................. | 141/312 |
| 5,100,389 A * | 3/1992 | Vaillancourt ................ | 604/135 |
| 5,239,773 A | 8/1993 | Doolittle, Jr. | |
| 5,248,062 A | 9/1993 | Hillard | |
| 5,275,214 A | 1/1994 | Rehberger | |
| 5,397,026 A | 3/1995 | Mayes | |
| 5,590,696 A | 1/1997 | Phillips et al. | |
| 5,891,086 A * | 4/1999 | Weston ........................ | 604/70 |
| 5,956,894 A | 9/1999 | Eldridge | |
| 5,971,950 A * | 10/1999 | Lopez et al. ................. | 604/500 |
| 6,032,411 A | 3/2000 | Foust | |
| 6,083,201 A * | 7/2000 | Skinkle ....................... | 604/151 |
| 6,251,098 B1 * | 6/2001 | Rake et al. ................... | 604/408 |
| 6,364,170 B1 | 4/2002 | Anderson et al. | |
| 6,561,237 B1 | 5/2003 | Brass et al. | |
| 6,629,384 B1 | 10/2003 | Webb | |
| 2001/0056259 A1 * | 12/2001 | Skinkle et al. .............. | 604/151 |
| 2002/0046486 A1 | 4/2002 | Wild et al. | |
| 2004/0079169 A1 * | 4/2004 | Wild et al. ................... | 73/861 |

OTHER PUBLICATIONS

Alemite Corporation Product Catalog Automatic Pressure Cup Product Specs Part 397932 Control: Service Instructions 43570-A2 www.Alemite.com Jul. 2005.

* cited by examiner

Primary Examiner—Teri Pham Luu
Assistant Examiner—Susan C. Alimenti
(74) Attorney, Agent, or Firm—David J. French

(57) ABSTRACT

A dispensing apparatus for dispensing fluid is disclosed. A fluid contained in a canister is pressurized by a moveable partition driven by spring means mounted within the canister. The canister is mated to an injection nozzle to allow fluid flow from the canister though the nozzle and possibly into a body to be provided with fluid. A preferred embodiment of the dispensing apparatus is for dispensing fluid or treatment chemicals into trees and plants.

17 Claims, 15 Drawing Sheets

APPARATUS FOR DISPENSING FLUID INTO A TREE

FIELD OF THE INVENTION

This invention relates to an apparatus for dispensing fluids. In particular, the invention relates to an apparatus for automatically dispensing liquids as, for example, into plants and trees, but is suited generally for applications requiring injection of a fluid.

BACKGROUND TO THE INVENTION

Plants and trees can be prone to numerous diseases and pests such as eastern spruce budworm, jack pine budworm, forest tent caterpillar, gypsy moth, Dutch elm disease, pine sawfly, pine false budworm, American chestnut blight etc. To prevent and/or control such diseases and pests there exist many appropriate treatment chemicals such as insecticides, fungicides, nutrients and growth hormones. The treatment chemicals are often sprayed on the leaves, spread on the soil at the base of the trees or injected in the root or the trunk of the trees. The latter method of directly injecting treatment chemicals into the tree is generally more efficient as well as posing less danger to the environment and will be the focus of the present specification, as an exemplary embodiment of the invention.

Injectors for injecting fluids into trees are well known. Mauget, in U.S. Pat. No. 4,365,440, issued Dec. 28, 1982, discloses a device wherein a discharge tube is inserted into a tree. A container containing treatment chemicals is then connected to the discharge tube thereby puncturing a container wall and allowing the treatment chemicals to flow from the container to the discharge tube and into the tree. To force the treatment chemicals into the tree, opposite ends of the container are required to be grasped and pressed. A disadvantage of this apparatus is that is requires that an operator be present with the injection device during the duration of the injection.

Doolittle, in U.S. Pat. No. 5,239,773, issued Aug. 31, 1993, discloses a tree injection device. Mounted on the injection device is a needle having a front end, an opposite end adapted for attachment to a source of pressurized liquid and a generally wedge-shaped free-end portion having top and bottom surfaces tapering to a thin edge across the free-end to facilitate penetration into the tree trunk. The needle of the apparatus is then inserted into the stem or trunk of a plant to inject liquid into the stem or trunk of the plant. A disadvantage of this device is again that it requires that an operator be present with the injection device during the length of the injection.

Eldridge in U.S. Pat. No. 5,956,894, issued Sep. 28, 1999, also discloses a tree injection apparatus and method for using it. Wild et al. in U.S. patent application No. 2002/0046486A1, published Apr. 25, 2002, discloses a woody plant injection method and apparatus. Here also, a disadvantage is that an operator must be present with the injection apparatus during the duration of the injection.

Many injection devices exist in fields outside the field of tree injection, particularly in the field of Surgery. For example, U.S. Pat. No. 4,394,863, issued Jul. 26, 1983 and U.S. Pat. No. 4,723,937, issued Feb. 9, 1988 both disclose automatic medicament injecting syringes. In both cases, the insertion of a hypodermic needle into a patient and the injection of medication are accomplished automatically by a spring force in response to a simple actuation. Fluid release is not, however, initiated by coupling to a nozzle. Nor are such devices designed to effect injection against a substantial back-pressure. Further, such injection devices would not be amenable to the field of tree injection for at least the concerns regarding the relative fragility of a needle being inserted into a tree.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this specification.

SUMMARY OF THE INVENTION

According to one aspect of the invention, a dispensing apparatus for dispensing fluid is provided in the form of a canister containing a moveable partition actuated by spring means. The canister is mateable to an injection nozzle which, in the case of a tree, may be akin to a spile but functioning in a reverse manner, to allow fluid flow from the canister though the injection nozzle into a body, such as a tree, to be injected.

According to a further aspect of the invention, a dispensing apparatus for dispensing a fluid is provided which comprises:

a) canister including:
   i) a cylinder having a base end and a top end;
   ii) a moveable partition having a bottom surface and a top surface, the moveable partition for being disposed between the base end and the top end for sealed, sliding displacement within the cylinder;
   iii) a variable volume for containing a fluid, the variable volume being included in the cylinder between the top surface of the moveable partition and the top end of the cylinder;
   iv) spring means for being disposed between the base end of the cylinder and the bottom surface of the moveable partition, the spring means being positioned for applying a force on the moveable partition;
   v) an output port disposed at the top end of the cylinder;
   vi) a valve/closure disposed at the output port; and
b) an injection nozzle having an injection passageway extending therethrough, the injection nozzle being mateable to the output port and having an injection nozzle end for delivering the fluid;

wherein upon mating the injection nozzle to the canister at the output port, the force applied by the spring means on the moveable partition causes an expression of the fluid present in the variable volume, thereby dispensing the fluid from the dispensing apparatus.

The spring means preferably includes at least one coil spring, but more preferably includes a series of inter-fitted or nested coil springs wherein different springs have different wire gauges. Further, the variable volume within the cylinder may have a width greater than the variable volume maximum length, while the maximum length of the variable volume may represent a reduced portion (e.g. 30–70%) of the total allowable deflection of the spring means. This arrangement insures that the injection pressure does not drop dramatically as the fluid is being dispensed.

While the use of mechanical springs is preferred, the spring means may also be in the form of a compressed gas.

This requires that the seal between the movable partition and the inside walls of the cylinder of the canister, as well as the base end of the canister, be gas tight.

According to another feature of the invention, the top end of the cylinder includes a top end inner surface and the top end inner surface and the top surface of the moveable partition are profiled to interfit so as to minimize the non-dispensed volume of fluid when the top end inner surface and the top surface of the moveable partition are placed substantially against each other. One or both of these surfaces may comprise interconnected cavities to allow reentry of fluid when the canister is refilled, thereby allowing refilling fluid pressure to act on the top surface of the moveable partition.

The valve/closure may be mechanically actuated, as by a control linkage. Preferably, however, the valve/closure may be based on use of a self-sealing, penetrable elastomer, such as styrene butadiene. The shape of the self-sealing valve/closure may include tapered or contoured surfaces shaped to increase the sealing or closing pressure of the self-sealing valve/closure around the injection nozzle as a result of the installation of the injection nozzle in the self-sealing valve/closure. A sealing pressure also arises from internal fluid pressure even if no contour or taper exists in the sealing valve/closure containment surfaces, however the taper/contour may usefully serve to increase the effect.

Conveniently, the outer surface of the base end of the cylinder and the outer surface at the top end of the cylinder may be of inter-fitting shapes that allow them to be stacked in a mechanically stable manner. Thus, for example, an inter-fitting recess may be present over one of such surfaces and the other surface may be of complementary form.

The injection nozzle may be provided in a variety of forms. According to a preferred form, the injection nozzle is provided with a needle having a bore extending therethrough, the bore of the needle forming part of the injection passageway. The needle is positioned within the injection nozzle so that, upon mating of the injection nozzle to the canister port, the needle penetrates through the self-sealing valve/closure, providing a path for fluid from the canister to pass through the injection nozzle.

By providing the nozzle as a separate component from the canister, the nozzle may be set in position with respect to the object to receive fluid before the canister is attached. Then, upon the mating of the nozzle and canister, fluid delivery can commence.

The delivery end of the injection nozzle can, in the case of the tree-injection system, be of a diameter that may be inserted into a pre-drilled hole, as through the bark of a tree. In other applications, the delivery end of the injection nozzle can be dimensioned to engage in fittings on other apparatus, such as a journal bearing which is to receive oil stored in the canister. While the injection passageway may be unobstructed, the injection nozzle may optionally include a supplementary valve allowing the injection passageway to be closed and/or opened automatically or as required.

By a further feature of the invention, a refilling nozzle for refilling the canister may also be provided. In a preferred embodiment of the refilling nozzle, a refilling needle may be slidingly mounted within the refilling nozzle, on a support that supplies a shut-off valve for the refilling passageway. The needle in its mount may be biased by a spring to hold the shut-off valve closed until the last moment of mating occurs between the canister and the refilling nozzle. Final closure of the gap between these two components may then open the shut-off valve, allowing fluid to be dispensed from, as an example, a hose connected to a source containing pressurized refilling fluid under a pressure sufficiently high to compress the spring means. Similarly, by reducing the pressure of the refilling system below that of the canister, the refilling nozzle may be used to empty fluid from a canister. On retraction of the refilling nozzle, the valve is arranged to close before the tip of the refilling needle becomes exposed. Such a source may be portable and therefore readily usable in the field. This allows recharging of canisters at a worksite.

According to a preferred application, the dispensing apparatus of the invention is suited for dispensing a fluid into a tree wherein the fluid may be a pesticide or fungicide. This may be done in accordance with the following method.

A hole is drilled in the tree selected for treatment, the hole being of a width and depth suited to receive the injection nozzle. The injection nozzle is inserted into the hole so that it is fixed in position on the side of the tree. The canister is then presented to the exposed, needle-end of the nozzle and mated with the nozzle base so that the nozzle needle penetrates through the penetrable self-sealing valve/closure into the interior volume of the canister. The canister, having been previously filled with fluid that is under pressure due to the spring means, will then dispense fluid through the injection nozzle under the urging of the spring means as the spring means moves the moveable partition towards the top end of the canister cylinder. Amongst a plurality of factors, the rate of fluid flow will depend upon the pressure exerted by the spring means. The canister may be left in position until the fluid has been substantially dispensed into the tree. The canister is then removed and the injection nozzle removed from the tree.

An advantage of this procedure is that the injection process may continue unattended while other trees are being fitted with fluid dispensing apparatus according to the invention.

While the invention has been described with respect to the inoculation of trees, the invention has applications wherever a fluid is to be delivered automatically, under pressure, into a body that requires an injection. The device may also be applicable to more than just injecting. Varying nozzles may make it applicable to spraying, mixing additives, pressure maintenance, or use as an accumulator.

The use of an injection nozzle separate from the canister allows for the sequential installation of the injector and canister with respect to the body to be injected. In the case of a tree, the injection nozzle may be fixed into its pre-drilled hole, as by hammering. Flow from the canister does not commence until the canister and injection nozzle are mated. Thus the valve/closure on the canister is actuated by the active mating of the injection nozzle to the canister.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
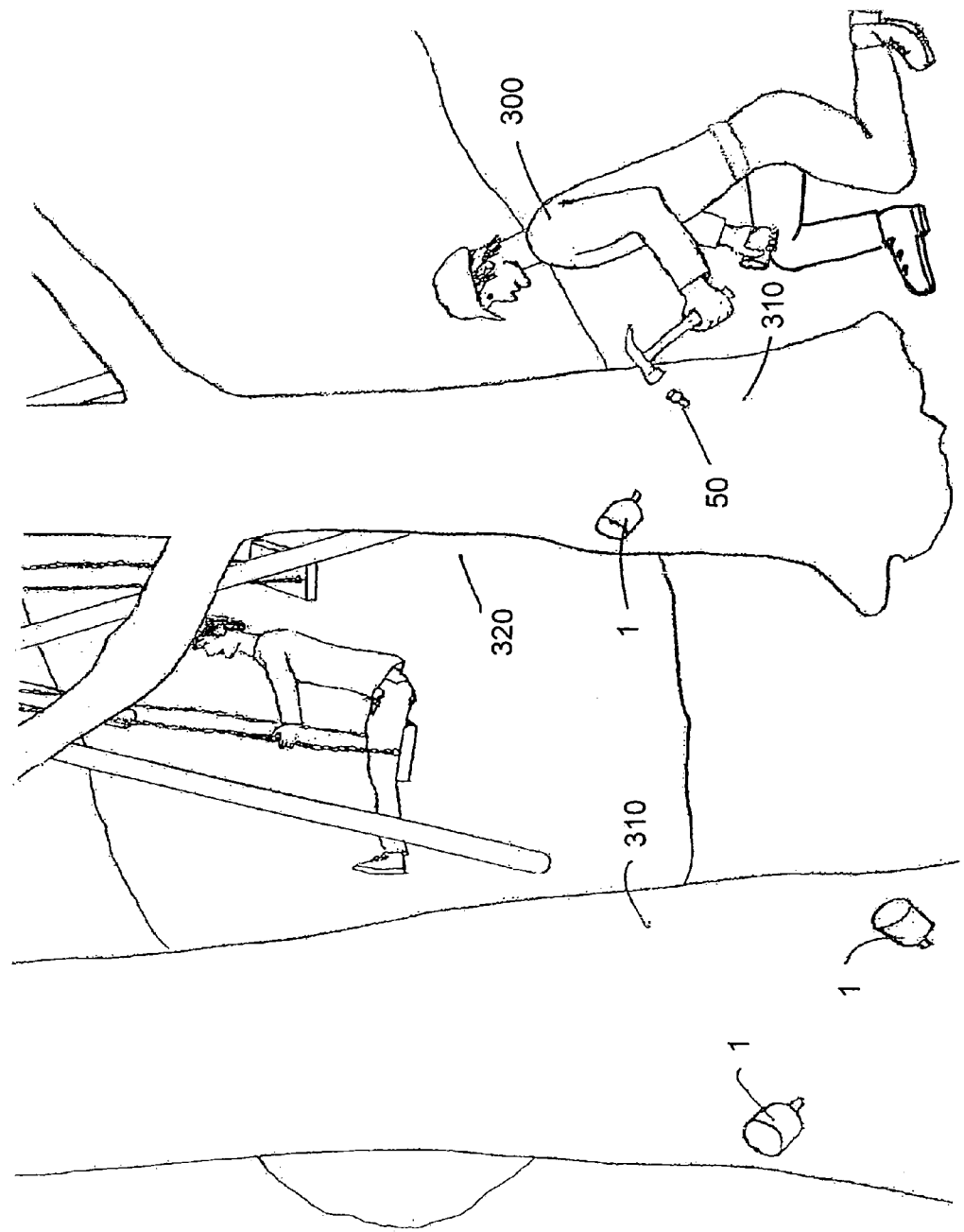
FIG. 1 is a pictorial depiction of a worker installing the injection system of the invention into a tree.

In FIG. 1, a worker 300 is in the process of installing a series of canisters 1 and injection nozzles 50 into a number of trees 320. This is done by drilling holes in the trunks 310, inserting an injection nozzle 50 into each hole and mating a canister 1 to each of the injection nozzles 50.

Figure 1A:
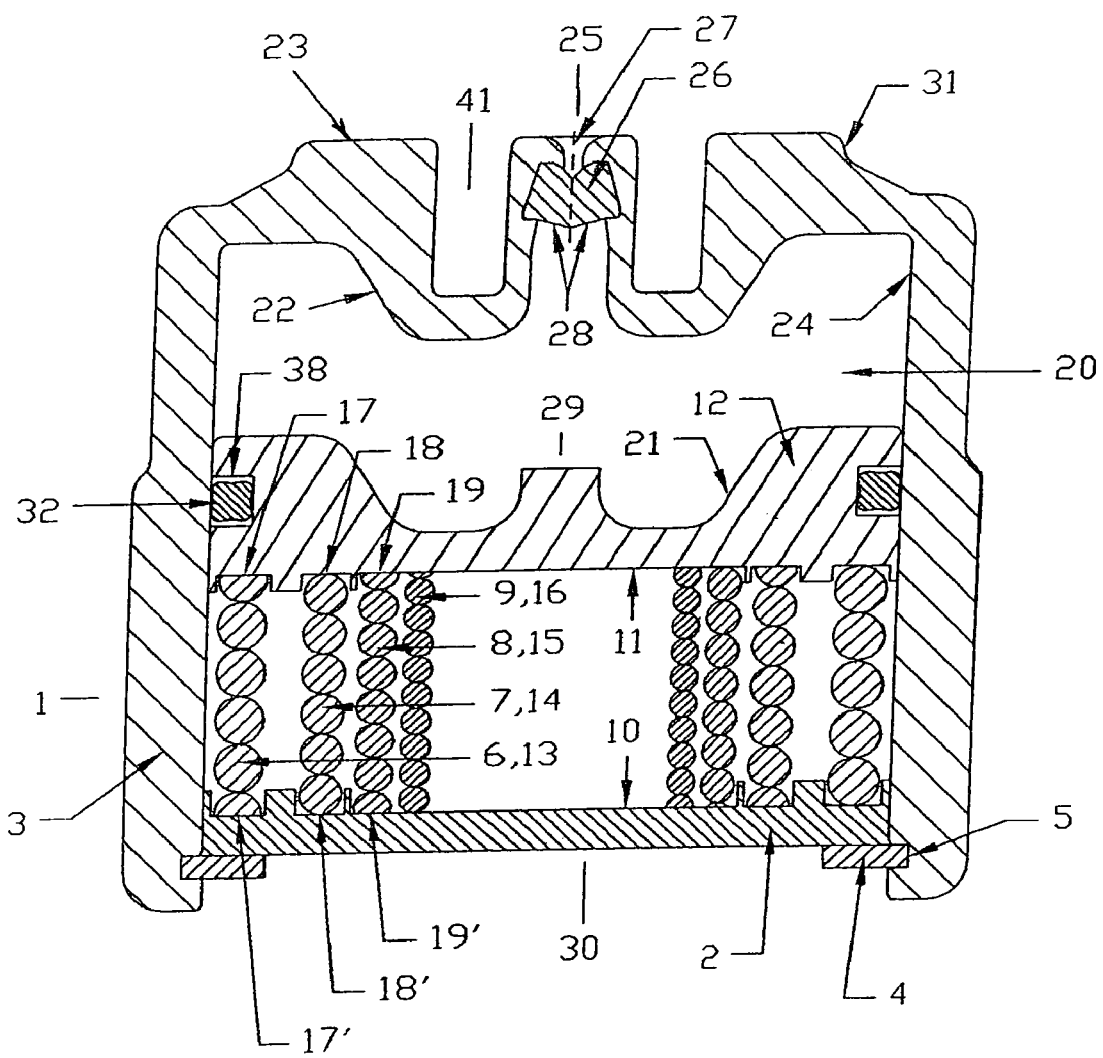
FIG. 1A depicts the canister portion of the fluid dispensing apparatus of the present invention in the side cross-section, with the springs fully compressed.

FIG. 1A depicts a vertical cross-section of the canister 1 of the fluid dispensing apparatus of the present invention. Here, we can see the base 2 disposed at the bottom end of cylinder 3. The base 2 is retained within cylinder 3 by a retaining ring 4 disposed in a groove 5 situated near the bottom end of cylinder 3. Compressed, nested coil springs 6, 7, 8 and 9 of differing gauges are shown disposed between the top surface 10 of the base 2 and the bottom surface 11 of the moveable partition 12. The springs 6, 7, 8 and 9 are generally made of wire and are depicted here as having wire cross-sections 13, 14, 15, and 16 that decrease with the spring label number and a number of turns per unit vertical length that increases with the spring label number. The number and properties of the multiple nested springs 6, 7, 8 and 9 govern the spring force provided for pushing on the moveable partition 12. Preferably, the collective springs 6, 7, 8 and 9 exert a force on the moveable partition 12 that does not collectively vary significantly over the travel range of the moveable partition 12. It is preferred to choose the springs 6, 7, 8 and 9 such that each inner spring has a outside diameter only slightly smaller than the inside diameter of its outer spring to facilitate the nesting and positioning of springs 6, 7, 8 and 9 during assembly and operation. To prevent lateral interference of adjacent springs with each other during operation of the fluid dispensing apparatus, the base 2 and bottom surface 11 of moveable partition 12 are provided with grooves 17, 18, 19, 17', 18' and 19' for nesting of the springs. The potential for interference may otherwise result from a horizontal displacement of at least one spring into interference with an adjacent spring. Alternately, and optionally as a supplemental feature, opposite winding lays for adjacent springs may be utilized to avoid interference.

The state of the canister 1 depicted in FIG. 1A with the springs 6, 7, 8 and 9 compressed is the state where the canister 1 is filled with fluid (not shown). The fluid occupies the variable volume 20 delimited by the top surface 21 of the moveable partition 12, the bottom surface 22 of the top end 23 of the cylinder 3 and the inside surface 24 of the cylinder 3. Surfaces 21 and 23 are profiled so as to minimize a volume of un-dispensed fluid present when the variable volume is fully dispensed.

Figure 3A:
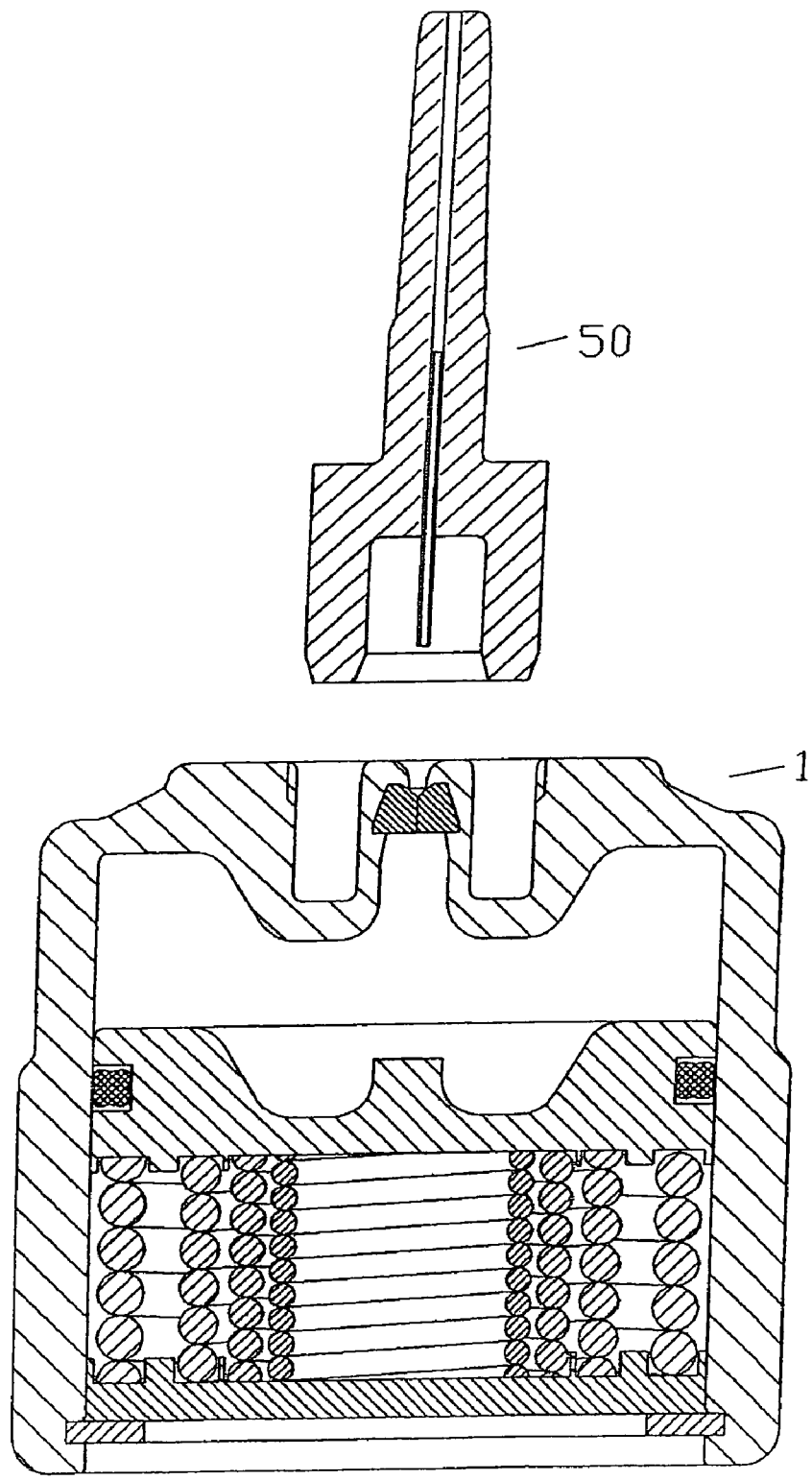
FIGS. 3A through 3C depict in cross-sectional views, three stages of the mating of an injection nozzle to a canister.

An output port 25 is disposed at the top end 23 of the cylinder 3. Disposed at the output port 25, in the preferred embodiment, is a self-sealing valve/closure 26 having a hole (not shown), the hole being collinear with the dashed line 27. When an object such as a needle (not shown) is inserted in the hole of the self-sealing valve/closure 26, an internal pressure within the self-sealing valve/closure, the internal pressure arising from compression, will cause the valve/closure material to press against the perimeter of the needle as depicted later in FIGS. 3A and 3C, affecting a seal around the needle. Pressure present within the variable volume may increase the sealing ability of the valve/closure, and this effect may be further increased through a geometry of the valve/closure facets 28 that biases the valve material to seal-up. The preferred material for the valve 26 in its self-sealing format is an elastomer, such as styrene butadiene, but other suitable materials may be employed.

Figure 1B:
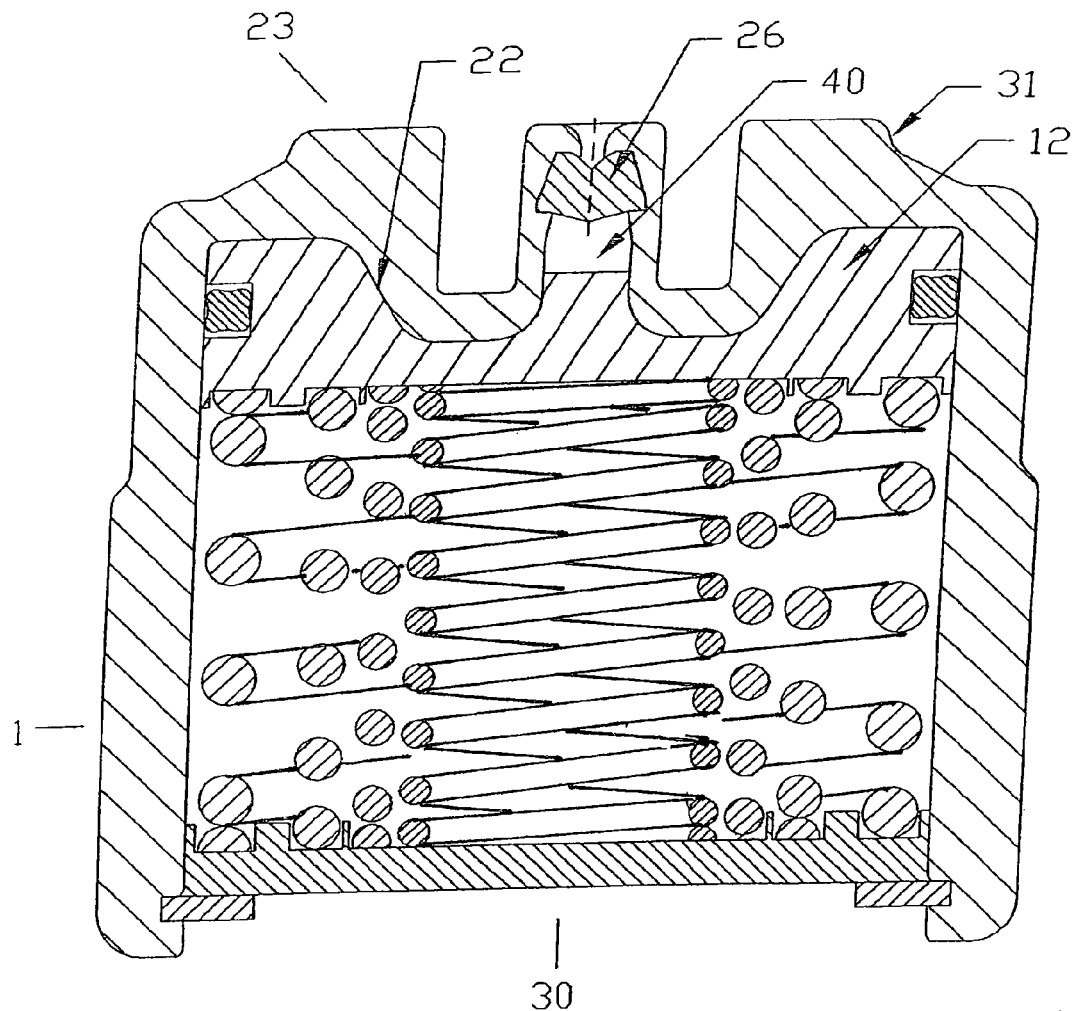
FIG. 1B depicts the canister portion of the fluid dispensing apparatus of the present invention with the springs expanded.
Figure 1C:
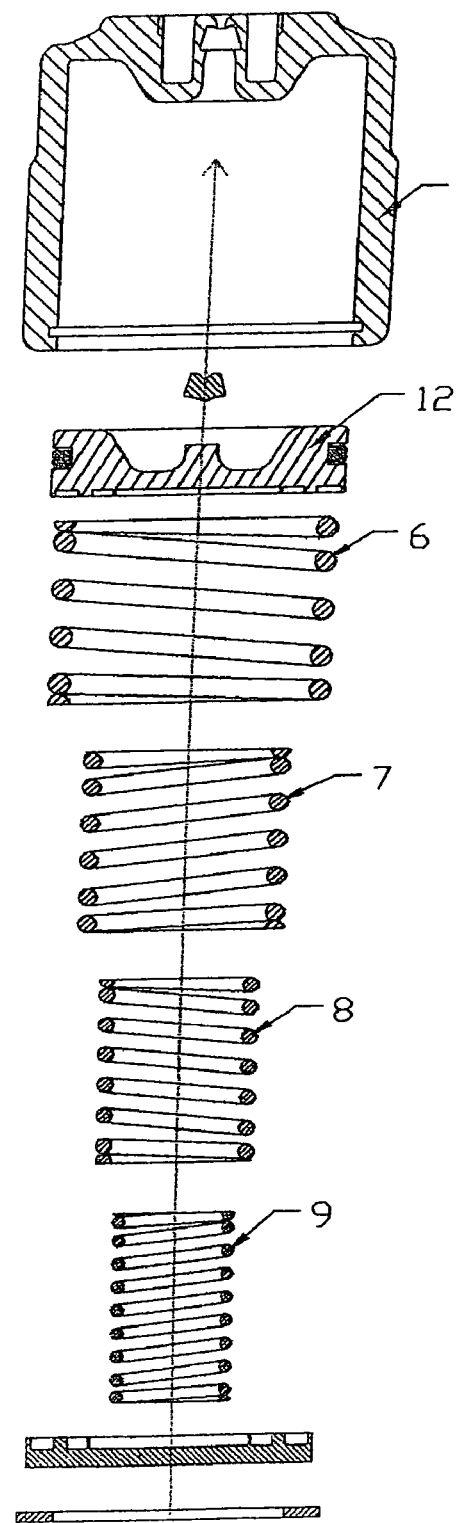
FIG. 1C depicts the canister portion of the fluid dispensing apparatus of the present invention with the springs and other components shown in an exploded view.

In FIG. 1B the canister 1 in a state where the moveable partition 12 is at its topmost position with its top surface 21 substantially in contact with the bottom surface 22 of the top end 23. A volume 40 for un-dispensed fluid is present immediately below the self-sealing valve 26. The distance comprised between the bottom of the self-sealing valve 26 and the segment 29 of the top surface 21 of the moveable partition 21 allows for a protruding needle (not shown) to protrude from the surface of the self-sealing valve 26 without coming into forceful contact with the top surface 21. Also shown in FIG. 1B are the springs 6, 7, 8 and 9 in a state of partial compression. In a preferred embodiment, when the moveable partition is as depicted in FIG. 1B, the springs 6, 7, 8 and 9, of progressively decreasing diameter, would each preferably be compressed to at least 30% of their total allowable deflection, or optionally by 60% or more of their allowable deflection. FIG. 1C provides an exploded view of FIG. 1B.

Figure 4:
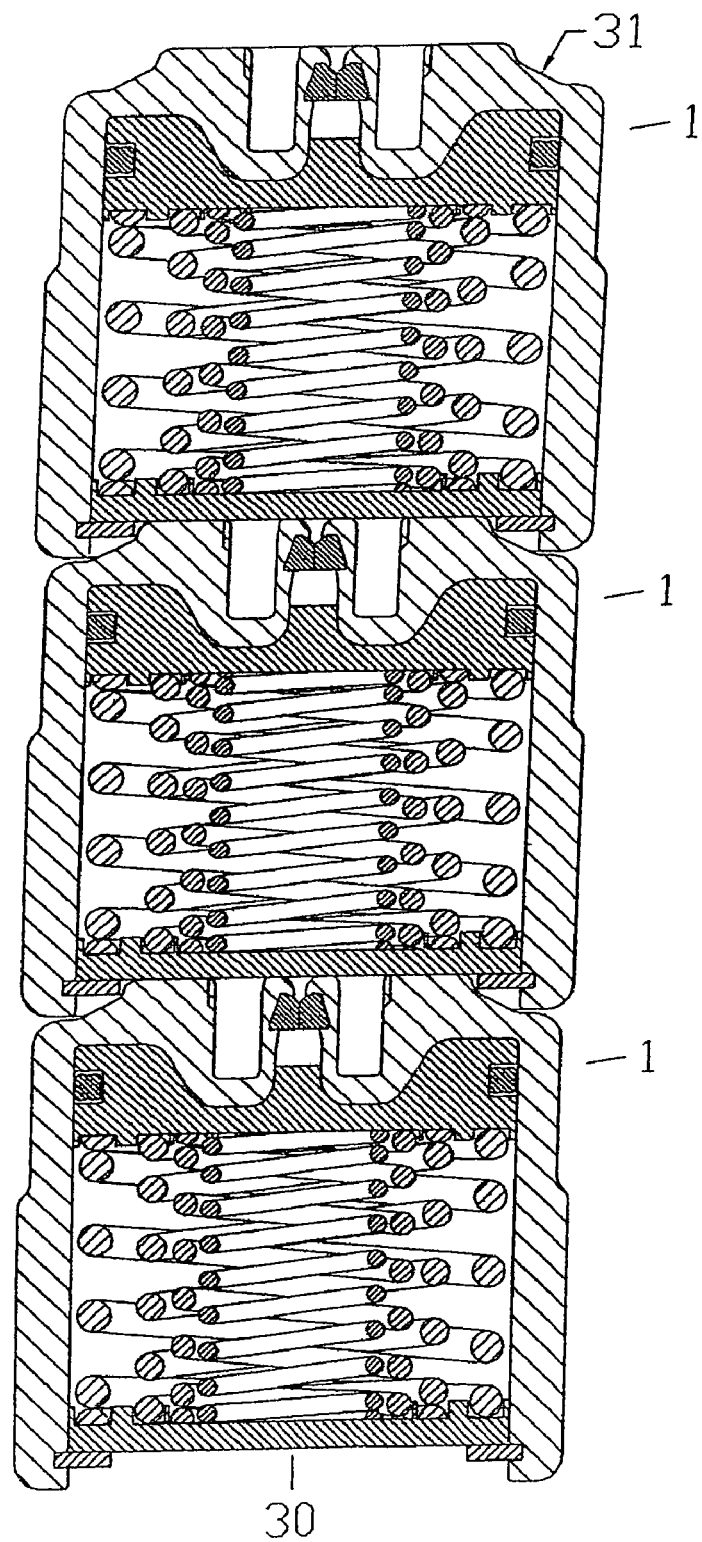
FIG. 4 depicts the stackability feature of canister part of the present invention.

The recessed bottom end 30 provided immediately below the base 2 together with the taper 31 provided at the top end 23 of the canister 1 allow for stable stacking of a plurality of canisters as depicted in FIG. 4. This stacking feature reduces the storage volume required for storing the canisters.

An additional feature of the canister 1 is that the moveable partition 12 comprises a groove 38 for receiving a seal ring 32 for sealing the variable volume 20.

Figure 2:
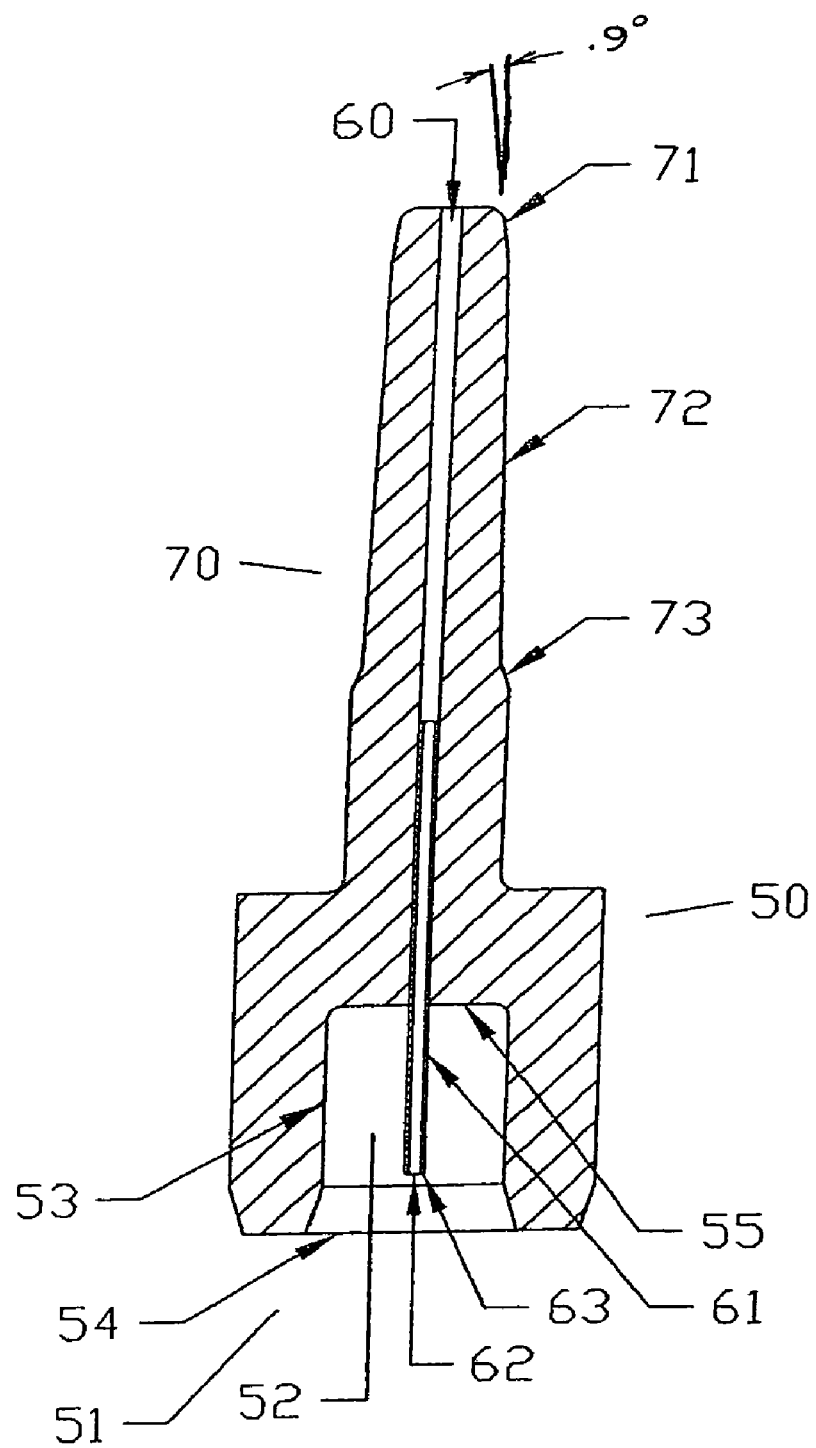
FIG. 2 depicts a cross-sectional view of an injection nozzle.

FIG. 2 depict in vertical cross-section an injection nozzle 50 that includes an injection nozzle bottom end 51 having a recess 52 delimited by a recess wall 53, a recess lower end 54 and a recess top end 55.

The injection nozzle 50 further includes a bore 60 extending therethrough wherein a needle 61 having a bore 62 extending therethrough is provided. The recess 52 is shaped for mating to the canister 1 output port 25 by aligning the injection nozzle bottom end 51 with the output port 25 of the canister 1 and then pushing and/or twisting the canister 1 towards the injection nozzle 50. The recess wall 53 then penetrates into an annular opening 41 of the canister top end 23 (shown in FIGS. 1A. 1B. Upon mating of the injection nozzle 50 to the canister 1, the tip of the needle 61 protruding from the recess top end 55 penetrates the self-sealing valve/closure 26 and accesses the variable volume 20 of the canister 1.

When the nozzle 50 is fully mated to the output port 25, the length of the tip of the needle 61 protruding from the cavity top end 55 is such that the needle end 63 is not in forceful contact with the moveable partition 12. Upon mating of injection nozzle 50 to canister 1, a fluid contained in the variable volume 20 of the canister 1, the fluid being under a positive pressure provided by the moveable partition 20 being pushed towards the canister top end 23 by the springs 6, 7, 8 and 9, will be pushed through the bore 62 of the needle 61 and further pushed through the bore 60 of the injection nozzle. Thereby, the fluid will be dispensed from the dispensing apparatus comprising the injection nozzle 50 and the canister 1.

Additionally, the nozzle 50 may be provided with an elongated portion 70 for inserting into a hole of a tree or plant for dispensing fluid, or treatment chemicals, into the tree or plant. The length of the elongated portion 70 may be provided with tapered segments. For instance, a first, more tapered segment 71 may be provided for facilitating the insertion of the nozzle 50 into a hole of a tree or plant. Furthermore, a second, less tapered segment 72 may be provided for providing a tight fit/seal between the injection nozzle 50 and the hole of the tree or plant as the injection nozzle 50 is inserted into the hole. Moreover, a third tapered shouldersegment 73 may be provided for limiting the penetration depth of the injection nozzle 50 into the tree. Depending on the treatment plan for the tree or plant to be treated, injection nozzles having different penetration depths may be provided.

Another feature of injection nozzle 50 is that it may be tapped or hammered at its cavity lower end 54 for insertion into a hole of a tree or a plant without causing damage to the needle 61. This needle-preserving feature is afforded by the fact that the end of the needle 61 protruding from the cavity top end 55 does not extend beyond the cavity lower end 54.

Moreover, the width of the nozzle bottom end 51 may be chosen so as to facilitate gripping by an operator or allow prying with a prying device thereby facilitating the removal of the injection nozzle 50 from a hole in a tree or plant.

Figure 3B:
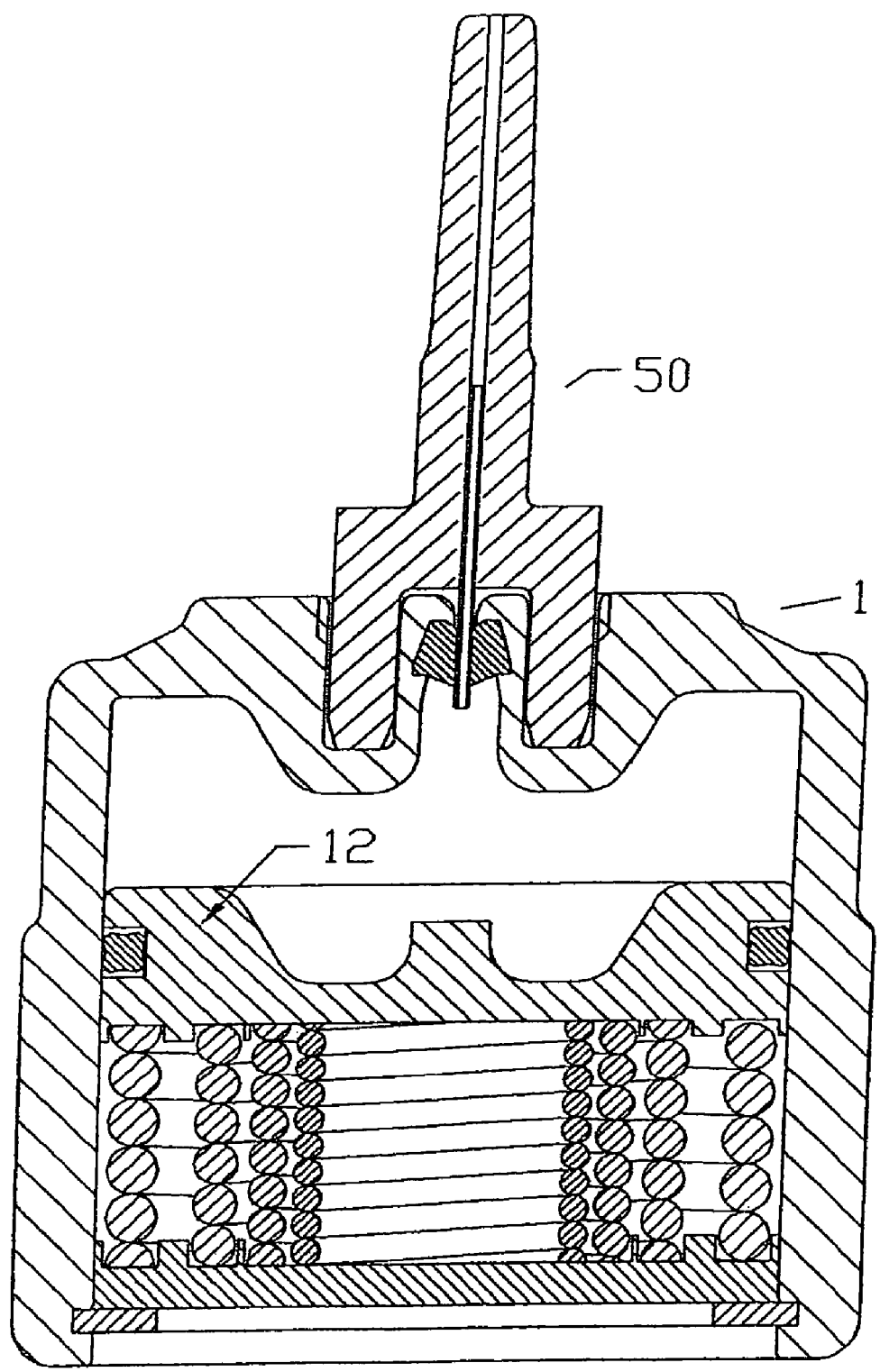
Figure 3C:
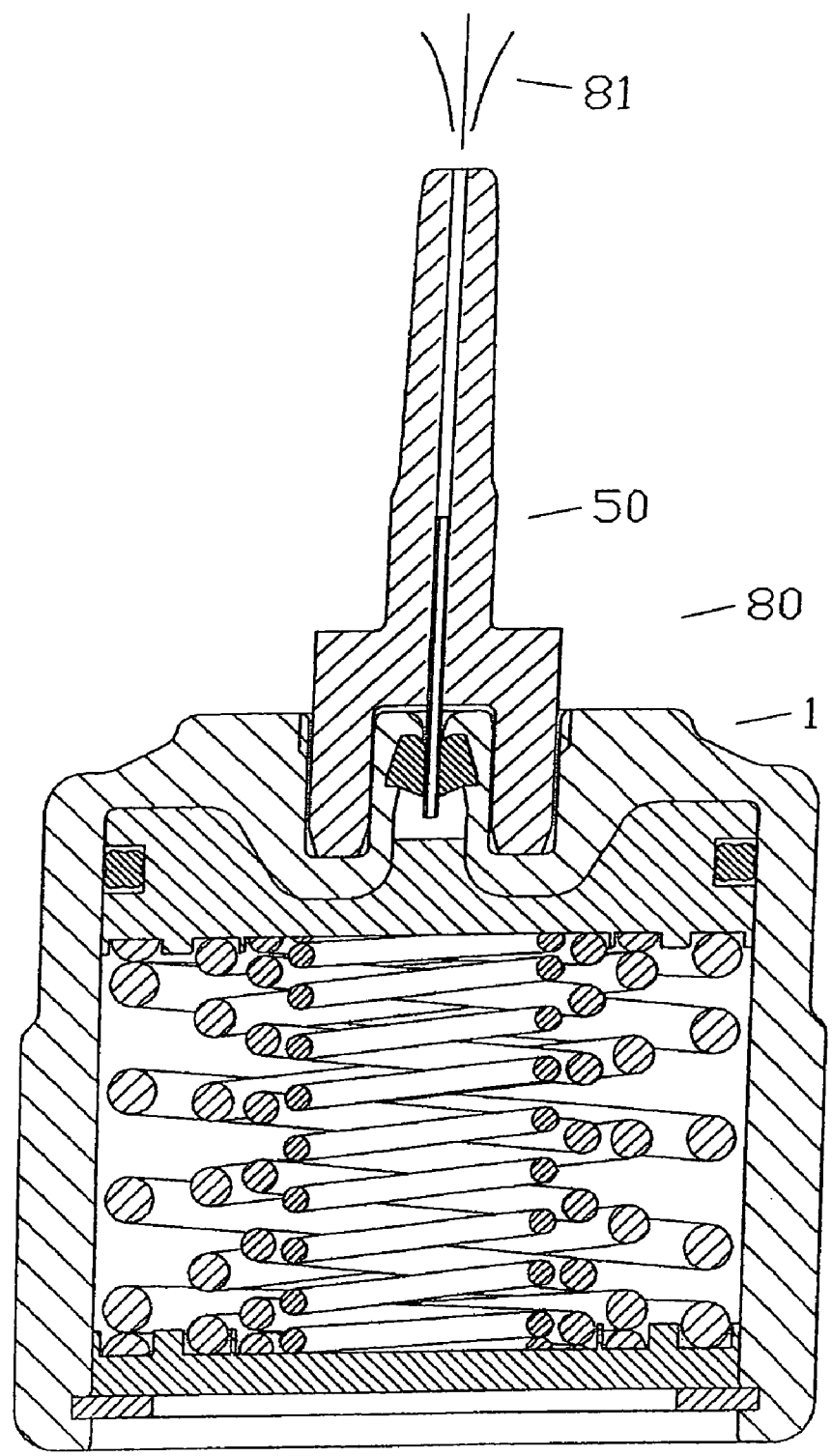

FIG. 3C shows the canister 1 mated to the injection nozzle 50 at the stage where and a fluid or treatment chemical 81 is dispensed from the dispensing apparatus 80.

The area of the cross-section surface of the moveable partition 12, and/or the spring force exerted by the springs 6, 7, 8 and 9 on the moveable partition 12 can be altered to achieve desired fluid dispensing pressure. The bore diameters of the injection nozzle 50 and the needle 61 and the fluid or chemical treatment 81 viscosity may be chosen so as to control the fluid or chemical treatment 81 flow rate. As injection rate into trees is often dependent on dispensing pressure, this device offers quick injection times because of its high and consistent injection pressure and maximum flow rate.

A method for using the preferred embodiment of the dispensing apparatus 80 shown in FIG. 3 would comprise the steps of: determining at which depth a fluid or treatment chemical 81 should be dispensed in a tree or plant; drilling a hole in the tree or plant to a depth no shallower than the determined depth; providing an injection nozzle 50 in dependence of the determined depth; inserting the injection nozzle 50 into the hole; providing a canister 1 filled with fluid or treatment chemical 81; and mating the canister 1 to the injection nozzle 50.

Figure 5A:
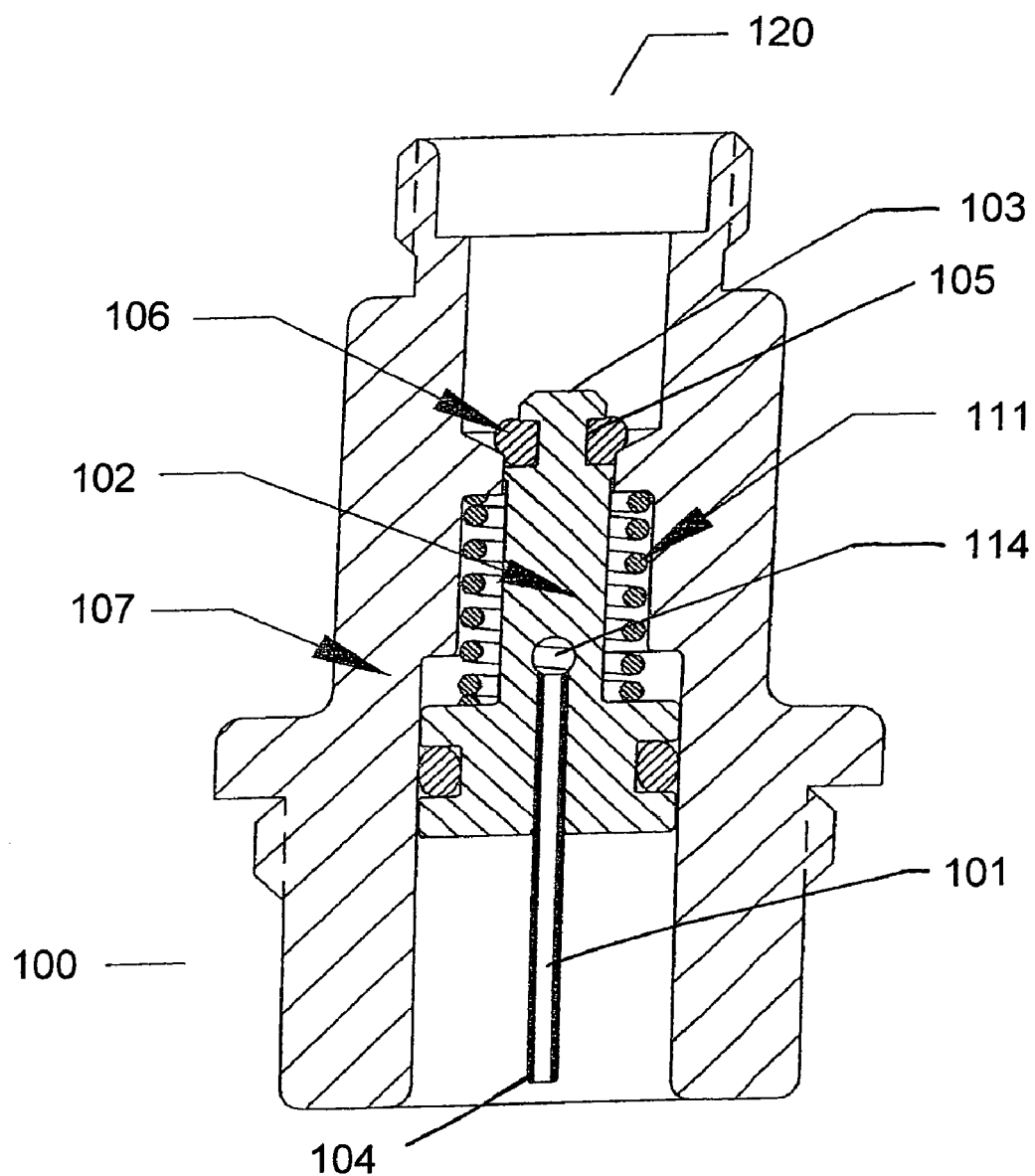
FIG. 5A depicts in a cross-sectional view, a refilling nozzle of the present invention.
Figure 5B:
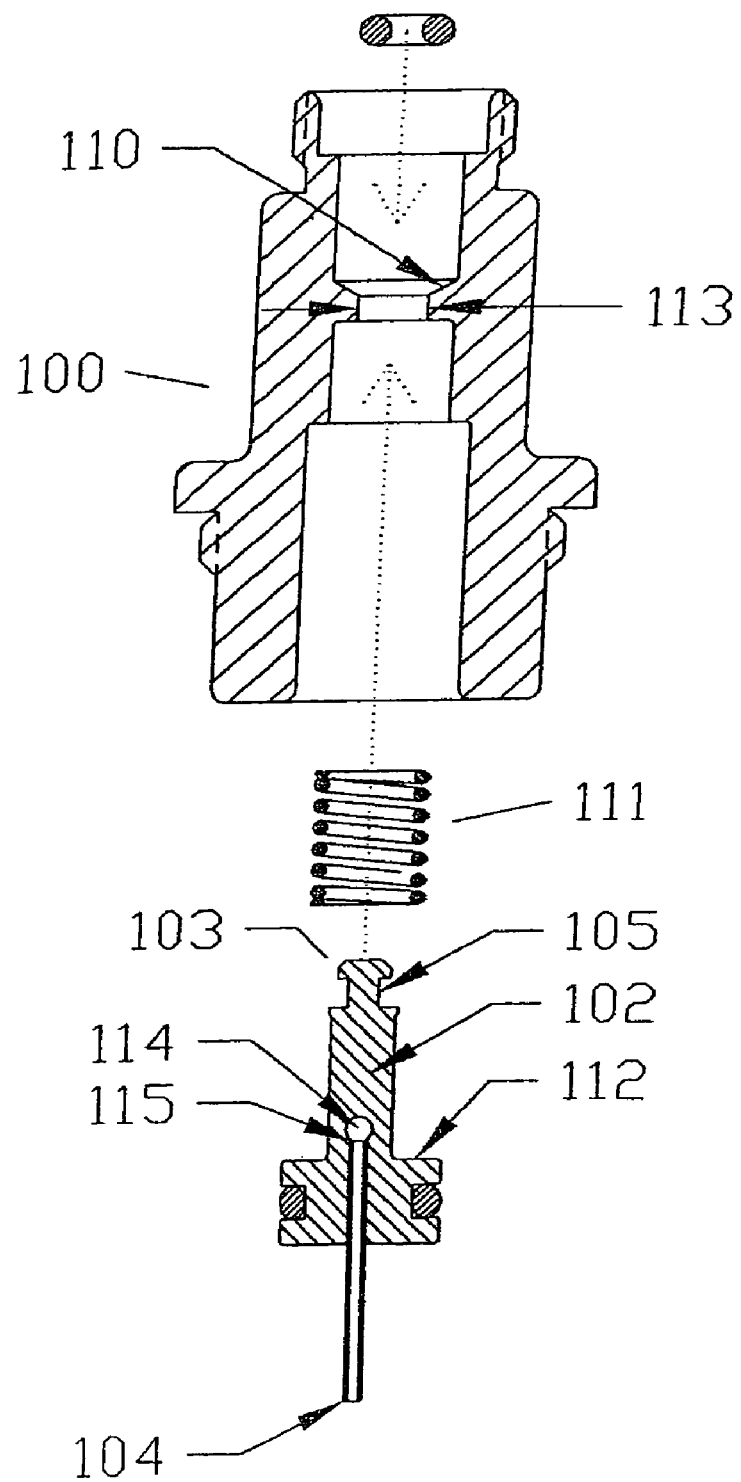
FIG. 5B depicts is an exploded view of the refilling nozzle of the present invention.
Figure 6A:
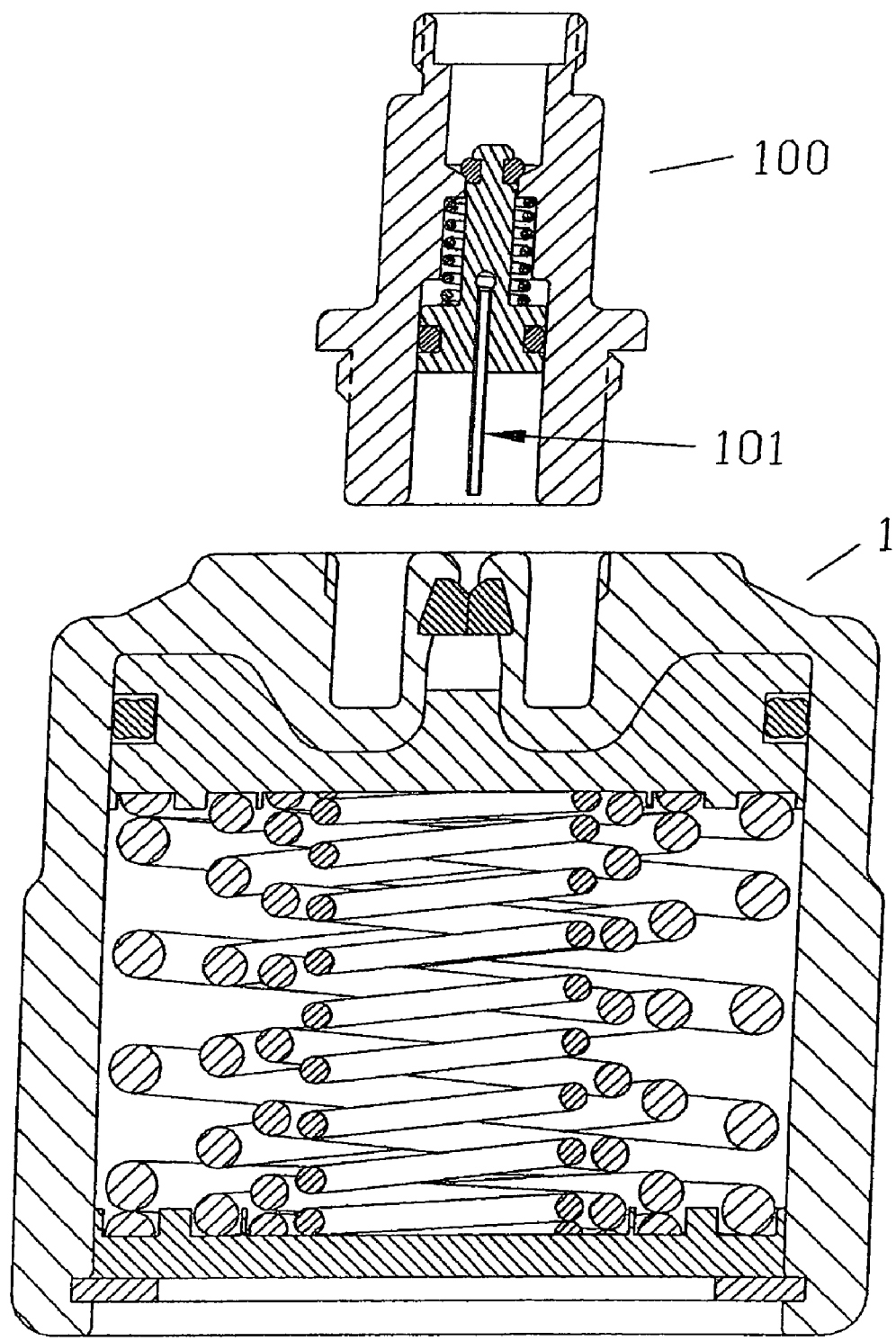
FIGS. 6A through 6C depict in cross-sectional views, three stages of the mating of a refilling nozzle to a canister.
Figure 6B:
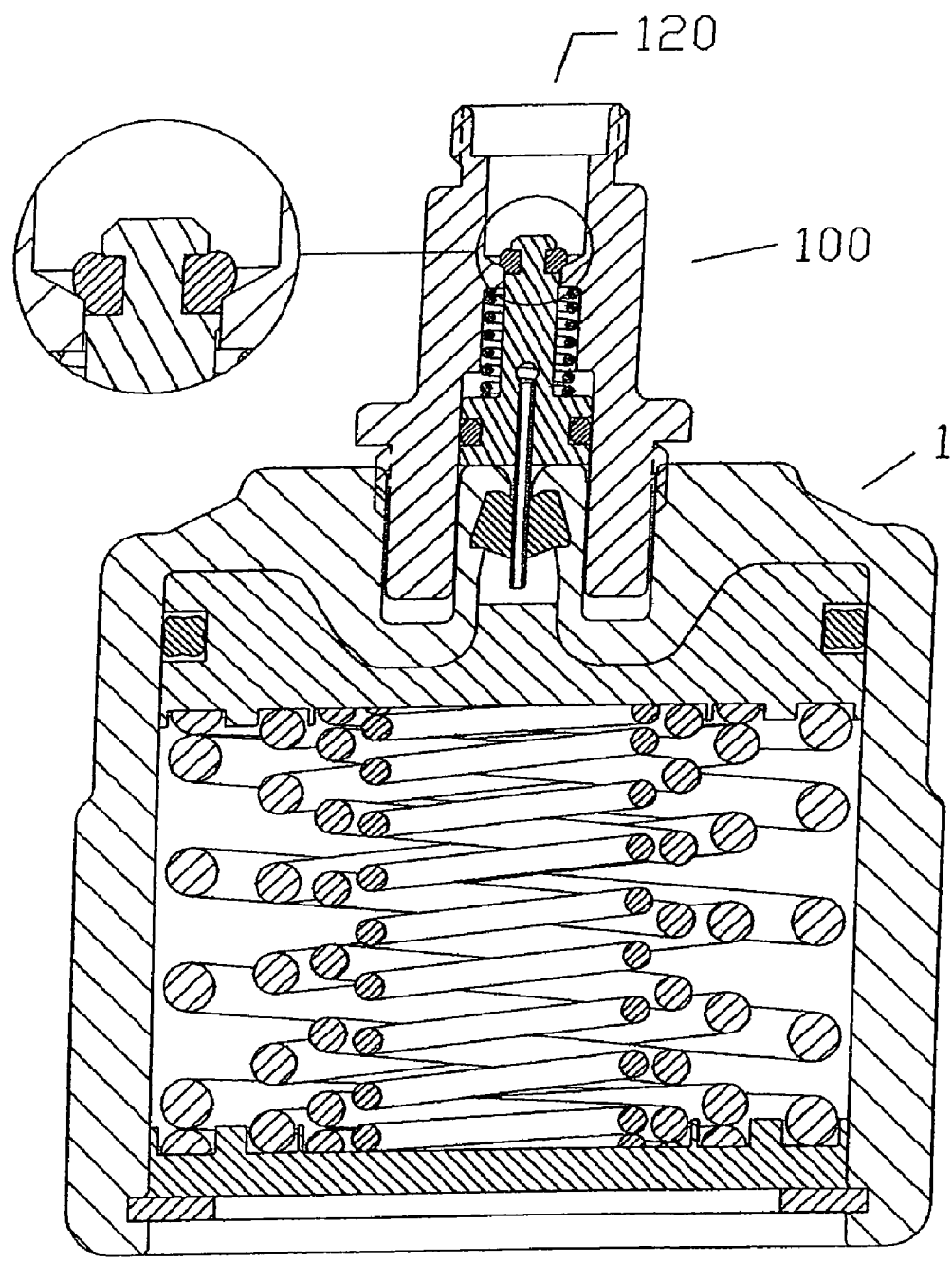
Figure 6C:
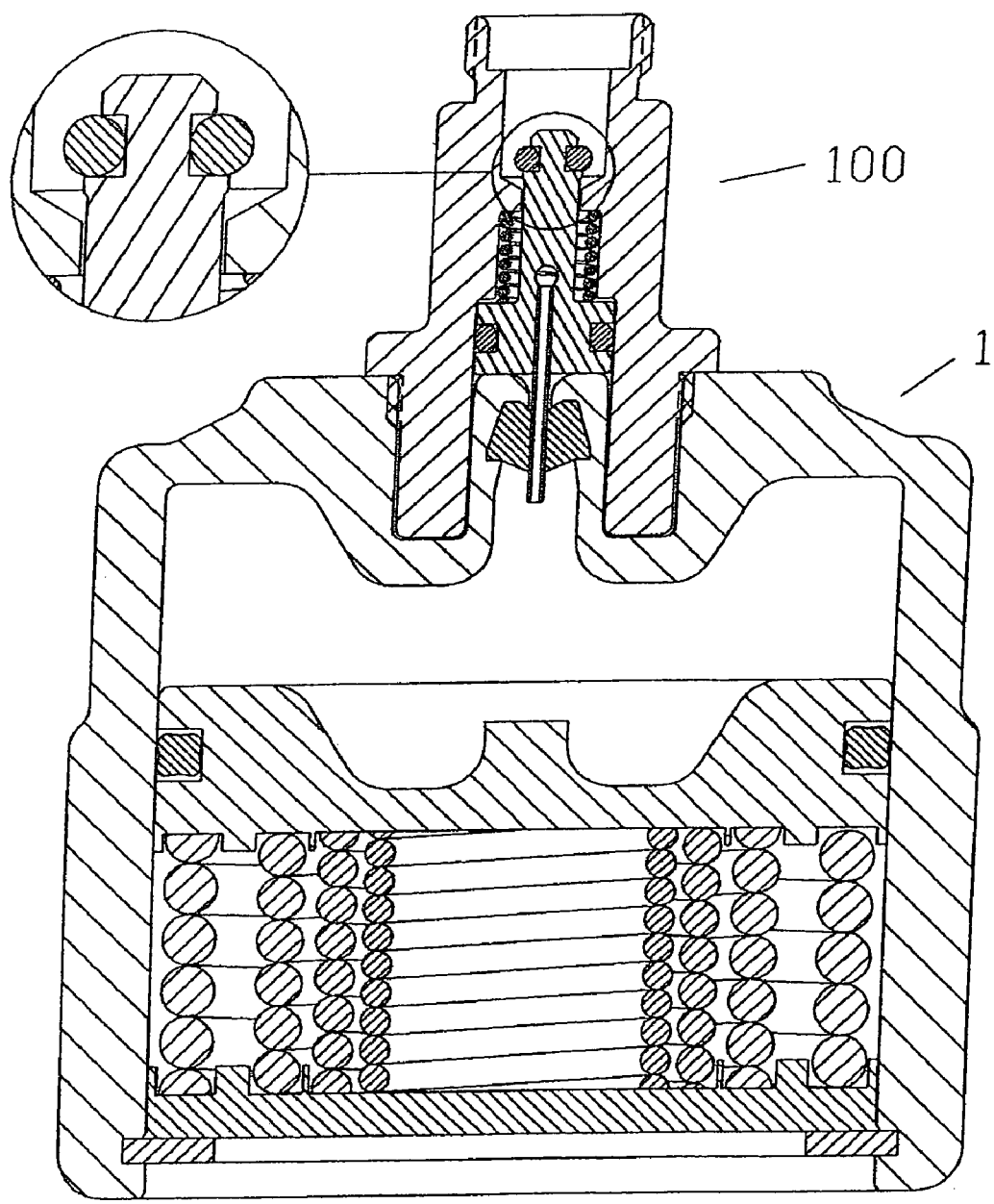

Once the canister has been depleted, it may be recharged through use of the refilling nozzle 100 depicted in FIGS. 5A and 5B, FIG. 5B depicting an exploded view of FIG. 5A. The refilling nozzle contains a refilling needle 101 carried in a shaft 102 terminating at an end 103 remote from the needle tip 104 in a groove 105 for a first "O" ring 106. The shaft 102 is included in a housing 107. When assembled as shown in FIG. 5A, the first "O" ring 106 seals against an inner rim 110 within the refilling nozzle 100. A compressed spring 111 extending around the shaft 102 is seated at one end on the inner rim 110, and at the other end on a seat 112 surrounding the refilling needle 101. Until further compression of spring 111, the first "O" ring 106 provides a seal that can block refilling fluid flow from the top 120 of the refilling nozzle to the tip 104 of the refilling needle 101. Compression of spring 111 raises the shaft 102 with respect to the housing 107 thereby raising the first "O" ring 106 off of rim 110. Refilling fluid (not shown) entering from the top 120 of the refilling nozzle 100 may then flow pass the first "O" ring and channel through a gap (not shown) comprised between the interior diameter 113 of the housing and the shaft 102. From there, the refilling fluid flows along a portion of the shaft 102 to a hole 114, said hole being in contact with the proximal end 115 of the refilling needle 101, and through the refilling needle 101. Compression of the spring occurs when the nozzle 50 is fully mated to the output port 25 of the canister. The spring force is such that it prevents a displacement of the shaft 102 towards the top 120 of the refilling nozzle before insertion of the needle 101 into the variable volume 20 through the valve/closure 26. On retraction of the refilling nozzle 100, the shaft 102 is such that the "O" ring seals against the inner rim 110 before the tip 104 of the refilling needle 101 becomes exposed. Furthermore, once the refilling nozzle 100 is fully mated to the output port 25 of the canister, a friction force or physical connection between the refilling nozzle and the output port overcomes the tendency of the force provided by the spring 111 to separate the refilling nozzle and the canister 1. Mating threads on the refilling nozzle and canister top end or the like can be employed to maintain the connection against the refilling nozzle's spring. Three mating stages of the refilling nozzle 100 to the canister 1 are shown in FIGS. 6A to 6C.

Figure 7:
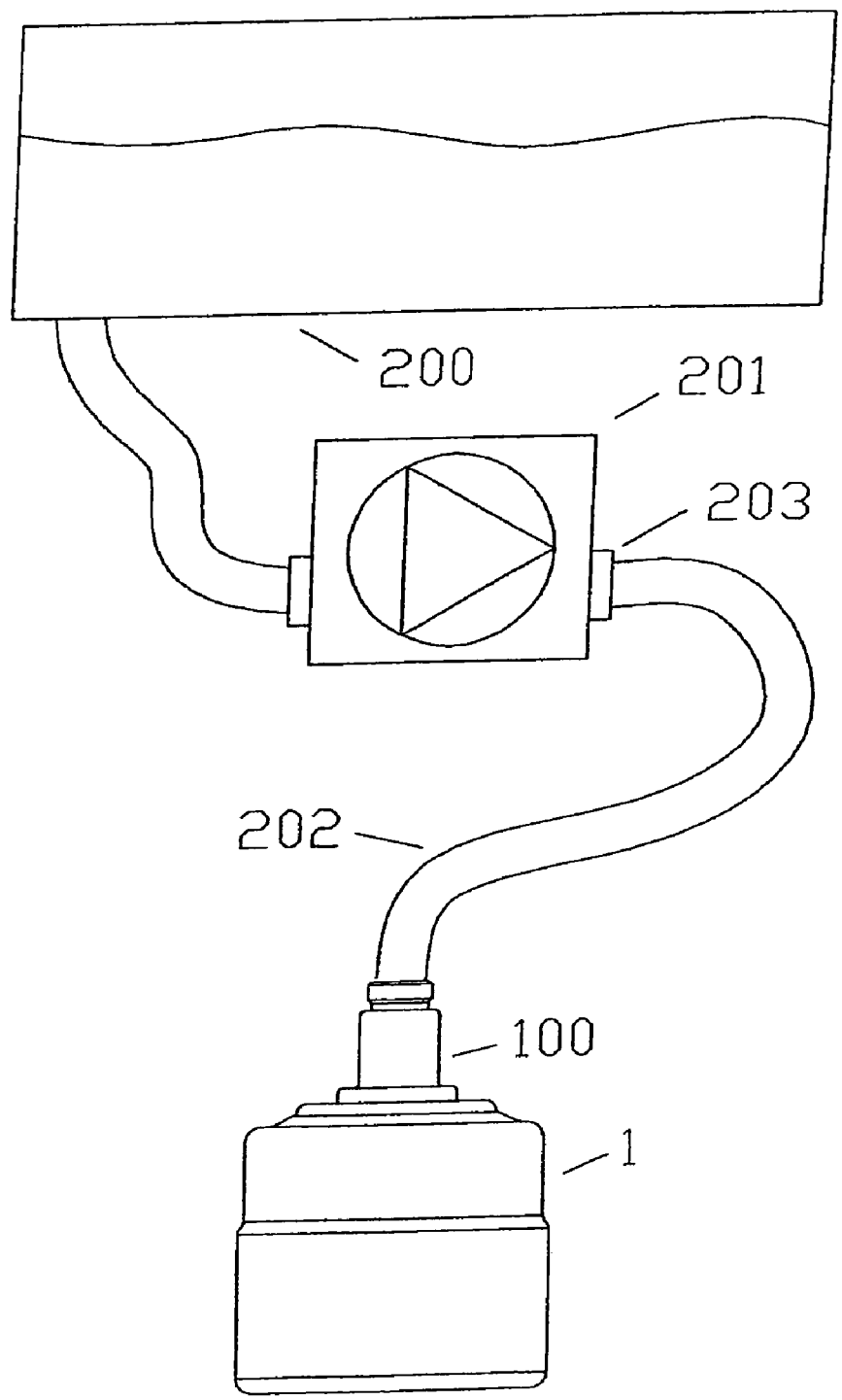
FIG. 7 shows the canister of FIG. 6C in the course of being refilled at a refilling station.

FIG. 7 depicts the refilling of a canister 1. The canister 1 is mated to a refilling nozzle 100 attached to a hose 202. The hose 202 is connected to a pump 201 via a port 203. The pump is connected to a refilling fluid reservoir 200 and provides a pressured refilling fluid output to hose 202.

CONCLUSION

The foregoing has constituted a description of specific embodiments showing how the invention may be applied and put into use. These embodiments are only exemplary. The invention in its broadest, and more specific aspects is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The invention claimed is:

1. A dispensing apparatus for dispensing a fluid into a tree, the dispensing apparatus comprising:
   a) a canister for containing an injection fluid, the canister having an interior cavity with inside cylindrical walls and an output port communicating with the interior cavity;
   b) a partition within the interior cavity dividing such interior cavity into a first subchamber communicating with the output port and a second subchamber on the side of the partition opposite such output port, the partition being a movable partition which is positioned within the interior cavity for sliding displacement therein and having a sealing fit against the inside walls of the interior cavity;

c) a valve/closure disposed at the output port for permitting the release of fluid contained within the first subchamber;

d) spring means for applying a force on the movable partition disposed within the second subchamber, the spring means being seated on the canister and being oriented to apply a force on the moveable partition, biasing the partition for displacement towards the valve/closure;

in combination with:

e) a nozzle having a bore extending there through, the nozzle being shaped at a first end for communication with the output port and being shaped at its other, second end in the shape for connection with a hole formed in a tree into which fluid is to be injected, wherein, upon connection of the nozzle at the output port, a flow path is available from the first subchamber through the valve/closure to permit fluid, expressed from the first subchamber by displacement of the partition in response to the force applied by the spring means, to pass through the bore of the nozzle, thereby dispensing the fluid from the dispensing apparatus, and wherein i) the valve/closure comprises a self-sealing solid plug of penetratable elastomeric material;

ii) the nozzle comprises a needle having a needle bore and needle tip, the needle being positioned at a recessed location within the first end of the nozzle for insertion through the plug for permitting a flow of fluid through the needle, iii) the needle tip is positioned within a recess in the nozzle whereby the needle tip does not extend beyond the first end of the nozzle, and iv) the first end of the nozzle has a hammerable outermost end, extending beyond the needle tip, for use in inserting of the nozzle into a tree.

2. A dispensing apparatus as defined in claim 1 wherein the spring means comprises a pressurized gas that is hermetically contained within the second subchamber.

3. A dispensing apparatus as defined in claim 1 wherein the spring means comprises a mechanical spring.

4. A dispensing apparatus as defined in claim 3 wherein the spring means comprises a plurality of nested helical springs.

5. A dispensing apparatus as defined in claim 4 wherein the maximum extension of said springs within the second subchamber is less than 70% of their maximum potential expansion.

6. A dispensing apparatus as defined in claim 5 wherein the maximum extension of said springs within the second subchamber is less than 30% of their maximum potential expansion.

7. A dispensing apparatus as in claim 4 wherein the nested springs each have an individual diameter and the diameter of each nested spring is progressively smaller proceeding inwardly within the second subchamber.

8. A dispensing apparatus as in claim 7 wherein said nested springs are seated within the canister to permit their expansion without interference arising between adjacent springs.

9. A dispensing apparatus as in claim 1 wherein the second end of the nozzle is tapered for insertion into a hole formed in the outside surface of a tree to provide a jam-fit therein.

10. A dispensing apparatus as in claim 1 wherein the canister has a tapered seat for receiving the self-sealing penetratable plug and such self-sealing penetratable plug has a tapered exterior that is complementary to the shape of said tapered seat.

11. A dispensing apparatus as in claim 1 wherein the canister has a top end surrounding the output port and an opposite, bottom, end, said top and bottom ends being of a complementary shape permitting consecutive canisters to be fitted into each other for stacking.

12. A dispensing apparatus as in claim 1 wherein said valve-closure is composed of styrene butadiene.

13. A dispensing apparatus as in claim 1 in combination with a refill nozzle having a bore extending there through, the nozzle being shaped at a first end for communication with the output port and being shaped at its other, second end for connection to a source of pressurized fluid to be inserted into said canister, wherein, upon connection of the refill nozzle to the canister at the output port, a flow path is available through said refill nozzle to permit fluid, supplied by said source of pressurized fluid, to pass through the bore of the nozzle and through the valve/closure into the first subchamber of the canister.

14. A dispensing apparatus as in claim 13 wherein said refill nozzle comprises a spring-biased valve means which is actuated to open upon connection of the refill nozzle to the canister, said spring-biased valve means being biased for closure prior to connection of the refill nozzle to the canister.

15. A dispensing apparatus as in claim 14 comprising holding means for holding the refilling nozzle and canister in a mated state.

16. A dispensing apparatus as in claim 1 wherein the object into which fluid is to be dispensed is a tree having bark and wherein the second end of the nozzle is tapered for insertion into a hole formed in the bark of the tree to provide a jam-fit therein.

17. A dispensing apparatus for dispensing a fluid into a tree, the dispensing apparatus comprising:

a) a canister for containing an injection fluid, the canister having an interior cavity with inside cylindrical walls and an output port communicating with the interior cavity;

b) a partition within the interior cavity dividing such interior cavity into a first subchamber communicating with the output port and a second subchamber on the side of the partition opposite such output port, the partition being a movable partition which is positioned within the interior cavity for sliding displacement therein and having a sealing fit against the inside walls of the interior cavity;

c) a valve/closure disposed at the output port for permitting the release of fluid contained within the first subchamber;

d) spring means for applying a force on the movable partition disposed within the second subchamber, the spring means being seated on the canister and being oriented to apply a force on the moveable partition, biasing the partition for displacement towards the valve/closure;

in combination with:

e) a nozzle having a bore extending there through, the nozzle being shaped at a first end for communication with the output port and being shaped at its other, second end in the shape for connection with a hole formed in a tree into which fluid is to be injected, wherein, upon connection of the nozzle at the output port, a flow path is available from the first subchamber through the valve/closure to permit fluid, expressed from the first subchamber by displacement of the partition in response to the force applied by the spring means, to pass through the bore of the nozzle, thereby dispensing the fluid from the dispensing apparatus, and wherein i) the valve/closure comprises a self-sealing solid plug of penetratable elastomeric material;
ii) the nozzle comprises a needle having a needle bore and needle tip, the needle being positioned at a recessed location within the first end of the nozzle for insertion through the plug for permitting a flow of fluid through the needle,
iii) the needle tip is positioned within a recess in the nozzle whereby the needle tip does not extend beyond the first end of the nozzle, and
iv) the second end of the nozzle is tapered for insertion into a hole formed in the outside surface of a tree to provide a jam-fit therein.

* * * * *